May 5, 1953     A. G. DAVIDSON     2,637,134
FISH LURE
Filed Nov. 20, 1947     2 SHEETS—SHEET 2
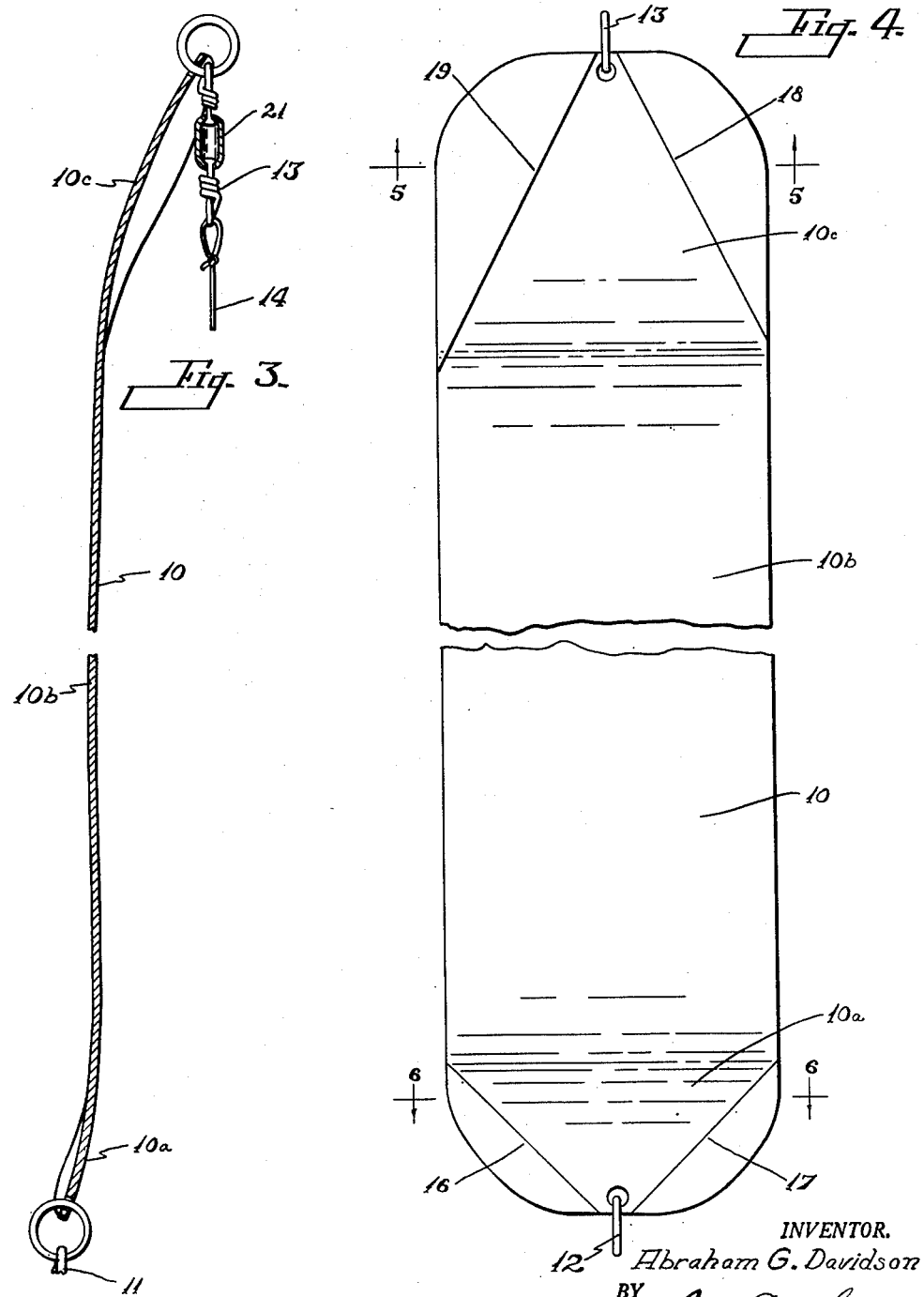
INVENTOR.
Abraham G. Davidson
BY
Smith & Wells Patented May 5, 1953

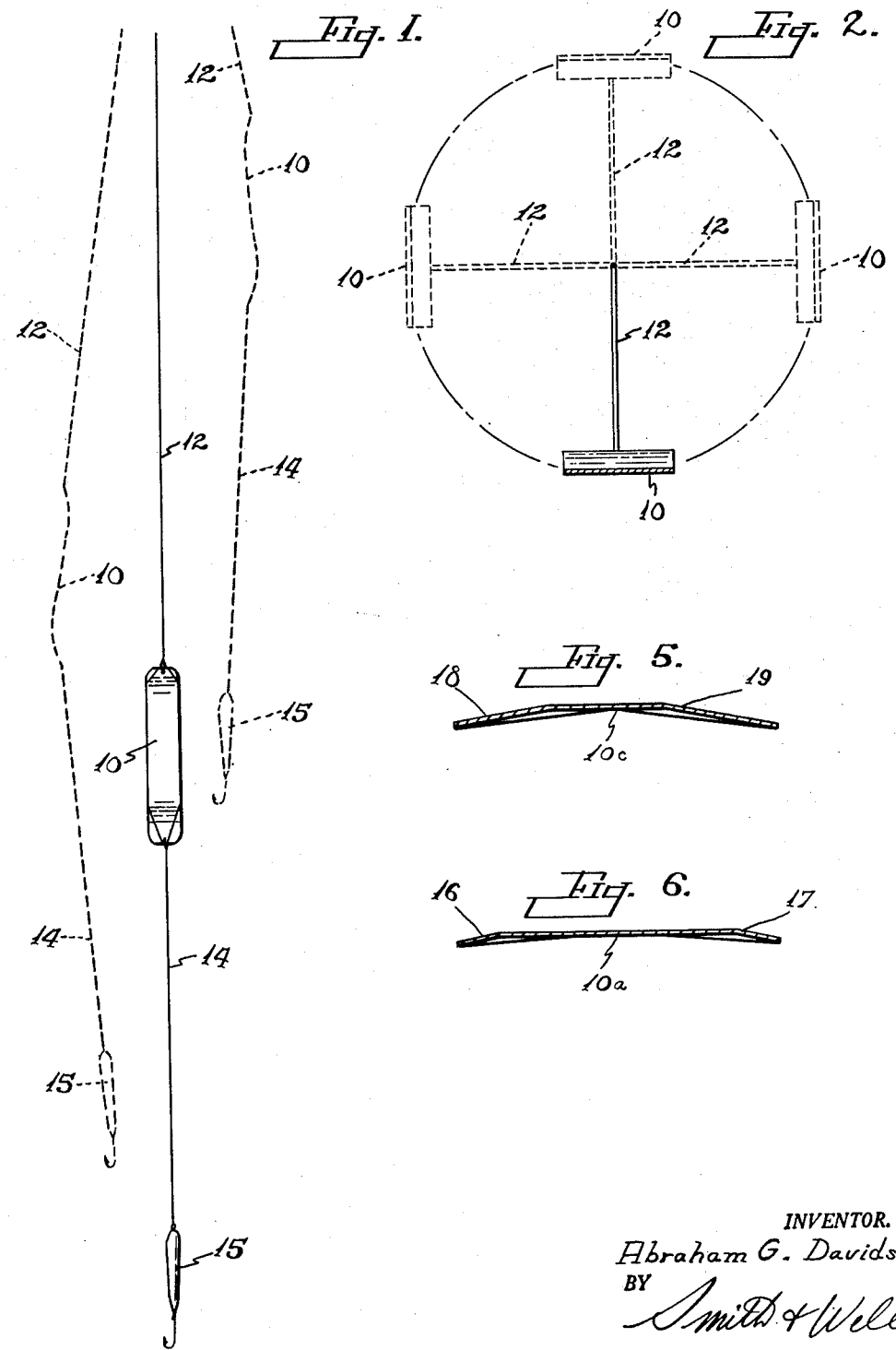

2,637,134

UNITED STATES PATENT OFFICE 2,637,134

FISH LURE

Abraham G. Davidson, Port Angeles, Wash., assignor to Harry Covington and Eugene Caulkins Application November 20, 1947, Serial No. 787,119

2 Claims. (Cl. 43—42.32)

My invention relates to improvements in fish lures.

More properly, my invention relates to the combination with any suitable lure or bait of an attractor or flasher which is arranged with the line and lure as a part of the direct connection to the lure and which moves, in response to the pull of the line, in a circular or spiral path ahead of the lure, causing the lure to have a slight darting and pulsating movement through the water.

I am aware, of course, that flashers or spinner attractors have been used ahead of the lure and in some cases spaced from the lure a substantial distance. My invention differs from such devices, in that the attractor flasher is so made and mounted as to cause it to move through the water in a wide circular (spiral) path and, being an integral part of the connection from the line to the lure, it causes the lure to pulsate and dart through the water with a motion that apparently is very similar to the live small fish, such as herring, on which the salmon, for which this attractor has been used, like to feed.

This attractor in combination with various lures has been used in salmon fishing along the coast of Washington, where it is proving quite effective in commercial fishing. It is, therefore, the purpose of my invention to provide a fish attractor, in combination with the line and hook carrying lure, which is interposed in the line at a substantial distance ahead of the hook carrying lure and which when pulled through the water moves in a rather large circular orbit, instead of spinning or wabbling, to thus bring about a darting action of the hook carrying lure.

It will be appreciated that the directional changes made by the hook carrying lure in following the changing direction of movement of the attractor are much slower than in the case of movement caused by spinners, spoons, etc., which are part of or closely associated with the hook carrying lure. In fact with this device operating it is easy to catch the flash on each revolution, as the speed is low enough to count the flashes. It may be that this slower movement or change in direction of the hook carrying lure is in part the reason for the fish taking it so readily. Likewise, the flashes from the attractor are at a slow enough rate to catch the attention of the fish.

The novel features that I consider characteristic of my invention are set forth with particularity in the claims. The invention itself, however, both as to its organization and its method of operation, together with additional objects and advantages thereof, will be understood from the following description of a specific embodiment when read in connection with the accompanying drawings, in which:

Figure 1 is a somewhat diagrammatic view of the attractor and hook carrying lure, as they are connected in the line showing how the wide circulatory movement of the attractor causes the hook carrying lure to dart with much narrower lateral movement than the attractor has;

Figure 2 is a diagrammatic view taken at right angles to Figure 1, illustrating the circular orbit of travel of the attractor;

Figure 3 is a longitudinal sectional view of the attractor;

Figure 4 is a face view of the attractor;

Figure 5 is a sectional view on the line 5—5 of Figure 4; and

Figure 6 is a sectional view on the line 6—6 of Figure 4.

Referring now to the drawings, the attractor 10 is shown in Figure 1 of the drawings to be attached by a swivel connection 11 to the line 12. Another swivel connection 13 at the rear end of the attractor 10 serves to attach one end of a short section 14 of line, the other end of which is attached to the lure 15. The distance between the attractor 10 and the lure 15 must be sufficient to prevent excessive movement of the lure as the attractor 10 circles on its way through the water. A distance of about three feet is normally sufficient.

The construction of the attractor is such that when it is drawn through the water it will travel in a circular orbit. The particular details of the construction that causes this travel are shown in Figures 4 and 6 inclusive. The exact dimensions of construction, however, may be departed from within the scope of my invention. The size of the attractor may be varied greatly. The length, the width, etc., are changed to suit different conditions. The essential construction features I deem necessary to obtain the desired cyclic turning of the attractor are the curved leading end 10a, the straight central portion 10b, and the reversely curved trailing end 10c having a substantially greater lateral displacement than the leading end. The corners of the attractor are rounded. Diagonal bends 16 and 17 are made at the leading end 10a. Similar diagonal bends 18 and 19, larger and longer, are provided in the trailing end 10c.

The attractor is made of a material of resilient nature such as spring brass and is highly polished to reflect light. The pull of the fish when caught may straighten out the attractor so that it is necessary to re-form the attractor by placing it in a die again. One of the diagonal bends 18—19 is made slightly longer and greater than the other. (See Figures 4 and 5 and the bend 19.)

The curvature of the ends of the attractor and the slight unbalance existing at the trailing end are sufficient to cause the attractor to tend to swing out from a straight path following the line, and to turn in a circular or spiral path as it is drawn through the water. The lure 15 being balanced to travel straight, follows the changing direction of the trailing end of the attractor, but, being spaced a substantial distance from the attractor, it is confined to much smaller variations from a straight path than is the rear end of the attractor. Swivel joints 21 are provided in the connections of the lines to the leading and trailing ends of the attractor. There is not, however, any real "spinning" action of the attractor about its own longitudinal axis. The bent portions at the ends formed by the bends 16, 17, 18 and 19, the curves and the flat shape of the attractor tend to oppose "spinning."

The nature and advantages of my invention are believed to be apparent from the foregoing description.

Having described my invention, I claim:

1. An attractor strip for insertion in the lead line ahead of a hook carrying lure, said strip comprising a resilient flat strip, smooth surfaced to reflect light said strip having a long straight intermediate portion and having a short curved trailing end and a substantially shorter curved leading end, both ends having lead line attaching means midway between the sides thereof, the leading end of the strip being curved in one direction from the plane thereof and the trailing end being curved in the opposite direction, the curved ends having diagonal bends extending from both side edges inward and to the ends of the strip, the portion of the trailing curved end outside the diagonal bend line at one side edge being larger in area than the portion of said end outside the diagonal bend line at the other side edge thereof.

2. An attractor strip for insertion in the lead line ahead of a hook carrying lure, said strip comprising a resilient flat strip, smooth surfaced to reflect light said strip having a long straight intermediate portion and having a short curved trailing end and a substantially shorter curved leading end, both ends having lead line attaching means midway between the sides thereof, the leading end of the strip being curved in one direction from the plane thereof and the trailing end being curved in the opposite direction, the curved ends having diagonal bends extending from both side edges inward and to the ends of the strip, one of the bends in the trailing end being extended farther along the side edge than the opposite bend at that end.

ABRAHAM G. DAVIDSON.

References Cited in the file of this patent

UNITED STATES PATENTS

| Number | Name | Date |
|---|---|---|
| 1,802,295 | Wear | Apr. 21, 1931 |
| 1,837,656 | Crosby | Dec. 22, 1931 |
| 1,924,350 | Cordell | Aug. 29, 1933 |
| 2,214,266 | Haury | Sept. 10, 1940 |
| 2,235,000 | Albers | Mar. 18, 1941 |
| 2,264,211 | La Chance | Nov. 25, 1941 |